United States Patent
Xu

(10) Patent No.: US 9,954,985 B2
(45) Date of Patent: Apr. 24, 2018

(54) FOLDABLE MOBILE TERMINAL

(71) Applicant: BOE TECHNOLOGY GROUP CO., LTD., Beijing (CN)

(72) Inventor: Zhiqiang Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/320,787

(22) PCT Filed: Jun. 19, 2015

(86) PCT No.: PCT/CN2015/081915
§ 371 (c)(1),
(2) Date: Dec. 21, 2016

(87) PCT Pub. No.: WO2016/115819
PCT Pub. Date: Jul. 28, 2016

(65) Prior Publication Data
US 2017/0201607 A1 Jul. 13, 2017

(30) Foreign Application Priority Data
Jan. 19, 2015 (CN) .......................... 2015 1 0025628

(51) Int. Cl.
*H04M 1/00* (2006.01)
*H04M 1/02* (2006.01)
(52) U.S. Cl.
CPC ....... *H04M 1/0216* (2013.01); *H04M 1/0268* (2013.01)
(58) Field of Classification Search
CPC ..... G06F 1/1616; G06F 1/1652; G06F 1/1681
(Continued)

(56) References Cited

U.S. PATENT DOCUMENTS

| 6,119,758 A | 9/2000 | Coenraets |
| 7,787,917 B2 * | 8/2010 | Aoki ..................... G06F 1/1616 |
| | | 455/566 |

(Continued)

FOREIGN PATENT DOCUMENTS

| CN | 201467183 U | 5/2010 |
| CN | 102035910 A | 4/2011 |

(Continued)

OTHER PUBLICATIONS

International Search Report and Written Opinion dated Oct. 23, 2015; PCT/CN2015081915.

(Continued)

*Primary Examiner* — Simon Nguyen
(74) *Attorney, Agent, or Firm* — Ladas & Parry LLP

(57) ABSTRACT

A foldable mobile terminal, including: an upper shell (11) and a lower shell (21) that are hinged, and a flexible panel (30) disposed on inner surfaces of the upper shell (11) and the lower shell (21); at least one of the upper shell (11) and the lower shell (21) can be pivoted inwardly or outwardly to an adjustable angle with respect to an hinge axis; a region of the upper shell (11) closer to the hinge axis includes an upper cavity (111), and a region of the lower shell (21) closer to the hinge axis includes a lower cavity (211); a region of the flexible panel (30) closer to the hinge axis includes a bending portion (301) and the flexible panel (30) can be bent at the bending portion (301); upon at least one of the upper shell (11) and the lower shell (21) is pivoted inwardly with respect to the hinge axis, the bending portion (301) is received in the upper cavity (111) and the lower cavity (211), so as to maintain a relatively large bending radius, and prevent the flexible panel from being broken.

7 Claims, 4 Drawing Sheets

(58) Field of Classification Search
USPC .................................................. 455/575.3
See application file for complete search history.

(56) References Cited

U.S. PATENT DOCUMENTS

| | | | | |
|---|---|---|---|---|
| 9,013,867 B2* | 4/2015 | Becze | ................... | G06F 3/1438 |
| | | | | 361/679.01 |
| 9,235,239 B2* | 1/2016 | van Dijk | ................ | G06F 1/1652 |
| 9,250,733 B2* | 2/2016 | Lee | ....................... | H04M 1/02 |
| 9,348,450 B1* | 5/2016 | Kim | ....................... | G06F 1/1681 |
| 2012/0307472 A1* | 12/2012 | Bohn | ................... | G06F 1/1616 |
| | | | | 361/807 |
| 2013/0342094 A1* | 12/2013 | Walters | ................... | G09F 19/00 |
| | | | | 312/319.2 |
| 2014/0042293 A1* | 2/2014 | Mok | ..................... | G06F 1/1652 |
| | | | | 248/682 |
| 2014/0328041 A1* | 11/2014 | Rothkopf | ............ | H04M 1/0216 |
| | | | | 361/807 |
| 2015/0257289 A1* | 9/2015 | Lee | ....................... | H05K 5/0017 |
| | | | | 361/749 |
| 2015/0257290 A1* | 9/2015 | Lee | ..................... | H04M 1/0216 |
| | | | | 361/749 |
| 2016/0070303 A1* | 3/2016 | Lee | ....................... | G06F 1/1616 |
| | | | | 361/679.27 |

FOREIGN PATENT DOCUMENTS

| | | |
|---|---|---|
| CN | 203014919 U | 6/2013 |
| CN | 103294113 A | 9/2013 |
| CN | 103578356 A | 2/2014 |
| CN | 104506688 A | 4/2015 |
| WO | 02/33685 A1 | 4/2002 |

OTHER PUBLICATIONS

First Chinese Office Action dated Nov. 7, 2016; Appln. No. 201510025628.1.

* cited by examiner

FOLDABLE MOBILE TERMINAL

TECHNICAL FIELD

Embodiments of the present invention relate to a foldable mobile terminal.

BACKGROUND

With rapid development of smart phone and mobile internet, ordinary smart phone cannot satisfy requirements of users any more. While hardware configurations of cell phone are better and better, and internet speed is faster and faster, users have put forward more and more strict demands in enlarging screens of cell phones. Cell phones with large screen play an excellent role in improving user experience and visual effect, and possess obvious advantages particularly in business communication, playing games, reading novel, watching movies and the like.

FIG. 1A is a schematic diagram illustrating a known foldable cell phone which is unfolding for a certain degree; and FIG. 1B is a schematic diagram illustrating the known foldable cell phone which is unfolding for 180°. The cell phone illustrated by FIGS. 1a-1b includes an upper shell 1 and a lower shell 2 which are hinged through a spindle 3; and a flexible panel 5 disposed at folding inner surfaces of the upper shell 1 and the lower shell 2. During the upper shell 1 and the lower shell 2 are being folded, the flexible display panel 5 is folded along therewith; in this way, a size of the cell phone is convenient for the user to carry; When the upper shell 1 and the lower shell 2 are unfolded for 180°, the flexible display panel 5 is flattened so as to satisfy demand of user for larger screen.

The abovementioned, known foldable cell phone involves defects that, it is easy for the flexible panel 5 to be broken due to an excessive bending angle generated during the upper shell 1 and the lower shell 2 are being folded, which may affect serve life of the cell phone.

SUMMARY

At least one embodiment of the present invention provides a foldable mobile terminal, which can prevent the flexible display panel from being broken due to excessive bending angle, so as to extend the serve life of the mobile terminal.

The foldable mobile terminal provided by the embodiments of the present invention includes: an upper shell and a lower shell which are hinged; and a flexible panel disposed at folding inner surfaces of the upper shell and the lower shell; at least one of the upper shell and the lower shell can be pivoted inwardly and/or outwardly to an adjustable angle with respect to a hinge axis; a region of the upper shell closer to the hinge axis includes an upper cavity, and a region of the lower shell closer to the hinge axis includes a lower cavity; a region of the flexible panel closer to the hinge axis includes a bending portion, and the flexible panel can be bent at the bending portion; upon at least one of the upper shell and the lower shell is pivoted inwardly with respect to the hinge axis, the bending portion can be received in the upper cavity and the lower cavity.

In the technical solution of the embodiments of the present invention, upon the mobile terminal is folded, the bending portion of the flexible panel can be received in the upper cavity and lower cavity, so as to maintain a relatively large bending radius. With the present technical solution, it can prevent the flexible panel from being broken due to excessive bending angle, so as to significantly extend the serve life of the foldable mobile terminal.

In an exemplary example, both the upper cavity and the lower cavity are arc shaped cavity. The arc shaped cavity has a similar shape with that of the bending portion of the flexible panel, which can not only guide the bending portion to bend without applying a relatively concentrated extrusion force to the bending portion, but also decrease a relative friction, so as to facilitate extending the serve life of the flexible panel.

In an exemplary example, the upper shell includes an upper chute connected with the upper cavity, and the lower shell includes a lower chute connected with the lower cavity. And, the mobile terminal further includes: an upper sliding plate mounted in the upper chute; a lower sliding plate mounted in the lower chute; and a driving element which is configured to drive the upper sliding plate to move to block an opening of the upper cavity and drive the lower sliding plate to move to block an opening of the lower cavity upon at least one of the upper shell and the lower shell is pivoted outwardly to a maximum adjustable angle with respect to the hinge axis; and the driving element is further configured to drive the upper sliding plate to move to expose the opening of the upper cavity and drive the lower sliding plate to move to expose the opening of the lower cavity upon at least one of the upper shell and the lower shell is pivoted inwardly with respect to the hinge axis to fold the mobile terminal.

With the technical solution above, upon the mobile terminal is unfolded to a maximum adjustable angle, the upper sliding plate moves until blocking the opening of the upper cavity, the lower sliding plate moves until blocking the opening of the lower cavity, and the bending portion of the flexible panel is supported by the upper sliding plate and the lower sliding plate so as to be parallel with the folding inner surfaces of the upper shell and the lower shell. The technical solution allows the flexible panel to have better display effect, and also excellent touch-control effect in case of touch screen.

In an exemplary example, a root portion of the upper shell includes an upper hinge element, a root portion of the lower shell includes a lower hinge element, and the lower hinge element and the upper hinge element are hinged with each other; the driving element includes: an upper linkage rod connected between the upper sliding plate and the lower hinge element, and a lower linkage rod connected between the lower sliding plate and the upper hinge element.

In an exemplary example, one of the upper hinge element and the lower hinge element has a hinge hole, and the other one of the upper hinge element and the lower hinge element has a hinge shaft which can be rotatablely mounted in the hinge hole.

In an exemplary example, the adjustable angle is within a range of 0°-180°.

In an exemplary example, the mobile terminal further includes a display panel disposed at an outside surface of the upper shell.

In an exemplary example, the flexible panel includes a flexible display panel and a flexible touch panel.

BRIEF DESCRIPTION OF THE DRAWINGS

Hereafter, the embodiments of the present invention will be described in a more detailed way with reference to the accompanying drawings, so as to make one person skilled in the art be able to understand the present invention more clearly, wherein.

NUMERAL REFERENCES

1—upper shell; 2—lower shell; 3—spindle; 4—flexible panel; 11—upper shell; 21—lower shell; 111—upper cavity, 211—lower cavity; 112—upper chute, 212—lower chute; 113—upper sliding plate, 213—lower sliding plate; 114—upper hinge element, 214—lower hinge element; 115—upper linkage rod, 215—lower linkage rod; 30—flexible panel, 301—bending portion.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terminology or scientific terminology used herein should have the same meaning as commonly understood by one of ordinary skill in the art to which this invention belongs. The terms "first," "second," etc., which are used in the description and the claims of the present application for invention, are not intended to indicate any sequence, amount or importance, but distinguish various components. Likewise, a term "a," "an," or "the" does not indicate limitation in number, but specifies the presence of at least one. A term "comprises," "comprising," "includes," "including", or the like means that an element or article ahead of this term encompasses element(s) or article(s) listed behind this term and its(their) equivalents, but does not preclude the presence of other elements or articles. The phrases "on," "under," "left," "right" or the like is only used to describe a relative positional relationship, and when the absolute position of a described object is changed, the relative positional relationship might also be changed accordingly.

In order to decrease a probability of breakage of the flexible panel and extend the serve life of the mobile terminal, the embodiments of the present invention provide a foldable mobile terminal. In the technical solution of the embodiments of the present invention, upon the mobile terminal is folded, a bending portion of the flexible panel can be received in an upper cavity and a lower cavity, so as to maintain a relatively large bending radius. With the present technical solution, it can prevent the flexible panel from being broken due to excessive bending angle, so as to considerably extend the serve life of the mobile terminal.

In order to make the objects, technical details and advantages of the present invention apparent, the present invention will be further described in a detailed way in connection with the accompanying drawings through exemplary embodiments.

Figure 1A:
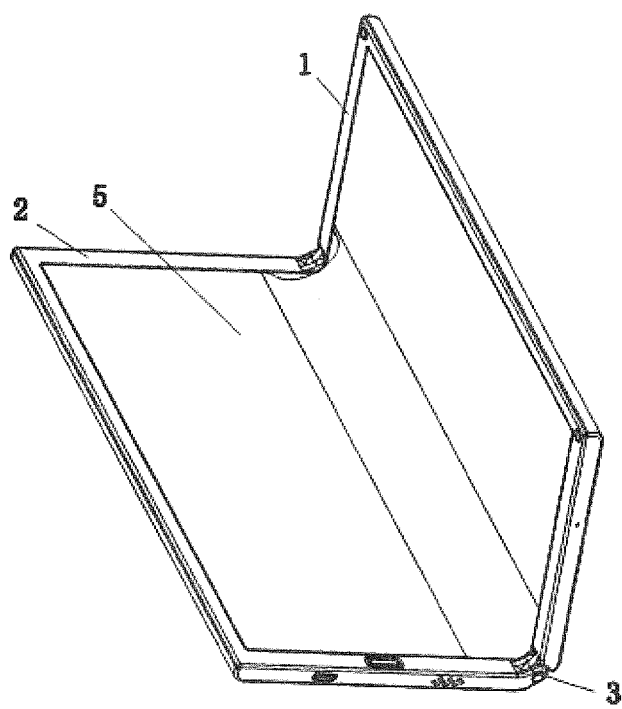
FIG. 1A is a structural schematic diagram illustrating a foldable cell phone which is unfolding for a certain degree.
Figure 1B:
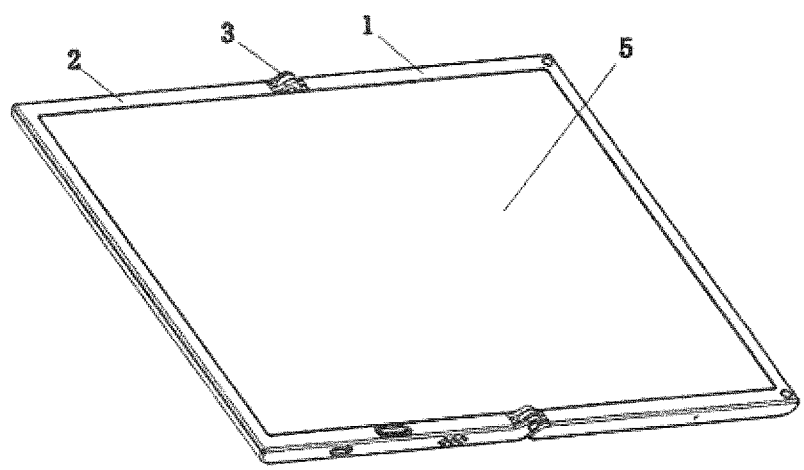
FIG. 1B is a structural schematic diagram illustrating the foldable cell phone illustrated by FIG. 1a which is unfolding for 180°.
Figure 2:
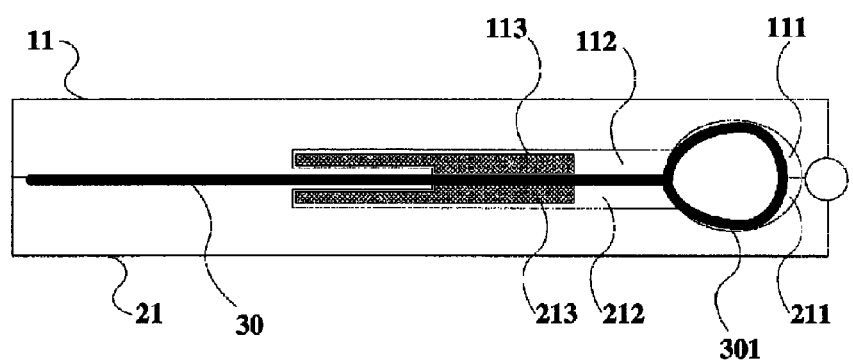
FIG. 2 is a sectional schematic diagram illustrating a foldable mobile terminal according to an embodiment of the present invention in a folded state.
Figure 3:
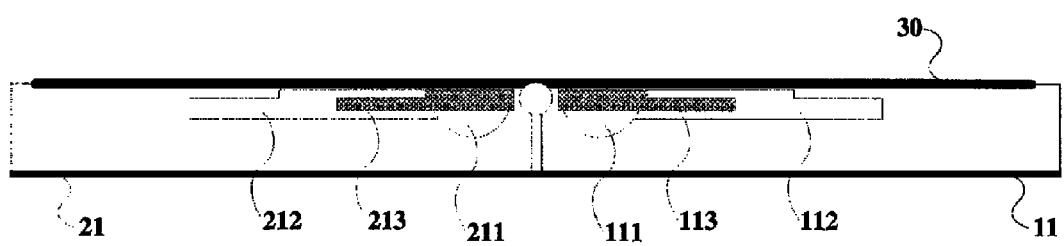
FIG. 3 is a sectional schematic diagram illustrating a foldable mobile terminal according to an embodiment of the present invention which is unfolding for 180°.

As illustrated by FIG. 2, the foldable mobile terminal provided by an embodiment of the present invention includes: an upper shell 11 and a lower shell 21 which are hinged; and a flexible panel 30 disposed on folding inner surfaces of the upper shell 11 and the lower shell 21; at least one of the upper shell 11 and the lower shell 21 can be pivoted inwardly or outwardly to an adjustable angle with respect an hinge axis; a region of the upper shell 11 closer to the hinge axis includes an upper cavity 111, and a region of the lower shell 21 closer to the hinge axis includes a lower cavity 211; a region of the flexible panel 30 closer to the hinge axis includes a bending portion 301 and the flexible panel 30 can be bent at the bending portion 301; wherein, upon at least one of the upper shell 11 and the lower shell 21 is pivoted inwardly with respect to the hinge axis, the bending portion 301 of the flexible panel 30 can be received in the upper cavity 111 and the lower cavity 211.

In the embodiment of the present invention, the specific type of the mobile terminal is not particularly limited herein, for example, it can be foldable cell phone, notebook computer, electronic paper and so on.

In an exemplary example, an outside surface of the upper shell 11 may be further provided with a display panel, in this way, upon the mobile terminal is folded, i.e., upon at least one of the upper shell 11 and the lower shell 21 is pivoted inwardly with respect to the hinge axis, an appearance of the mobile terminal is similar to a conventional mobile terminal with a single screen, and an user can perform conventional operations on the display panel on the outside surface of the upper shell 11; at this time, the flexible panel 30 may be in a sleep state. If the user intends to operate the flexible panel 30, he/she only has to unfold the mobile terminal, i.e., pivoting at least one of the upper shell 1 and the lower shell 21 outwardly with respect to the hinge axis to activate and lighten the flexible panel 30, so as to obtain excellent visual effect and experience with larger screen. Besides, depending on the type of the mobile terminal, the flexible panel 30 may be a flexible display panel with only display function, and may also be a flexible touch panel with both of touch-control function and display function.

Figure 5:
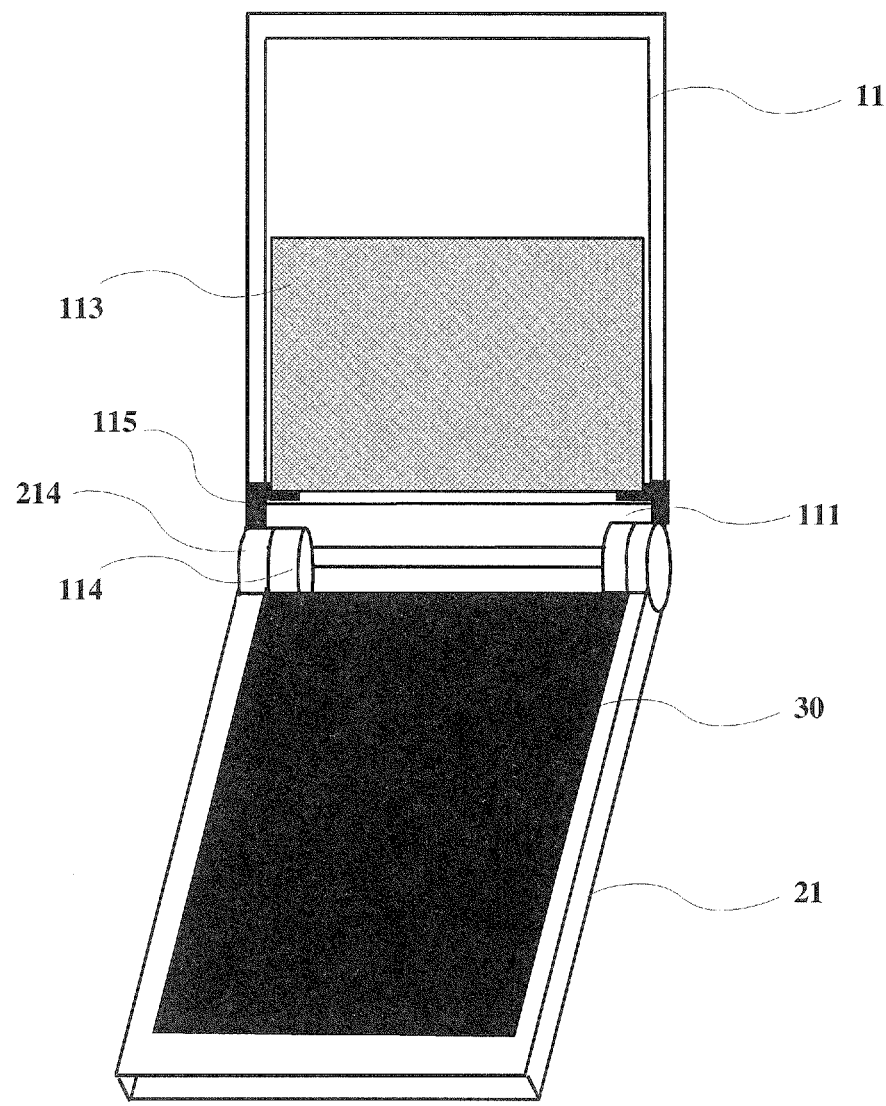
FIG. 5 a schematic diagram illustrating a movement of an upper sliding plate in a foldable mobile terminal according to an embodiment of the present invention.

As illustrated by FIG. 5, in an exemplary example, a root portion of the upper shell 11 includes a hinge element 114, a root portion of the lower shell 21 includes a lower hinge element 214, and the lower hinge element 214 and the upper hinge element 114 are hinged with each other (i.e., one of the two hinge elements has a hinge hole, and the other has a hinge axis rotatablely mounted in the hinge hole). Besides, in other embodiments of the present invention, the upper shell 11 and the lower shell 21 may each include a hinge hole, and achieve hinged connection through a hinge pin. That is, in the embodiments of the present invention, the specific way for the upper shell 11 and the lower shell 12 to achieve hinged connection is not particularly limited herein.

In an exemplary example, the adjustable angle between the upper shell 11 and the lower shell 21 is preferably selected from a range of 0°-180°. It shall be noted that, in other embodiments of the present invention, the adjustable angle between the upper shell 11 and the lower shell 21 may be larger than 180°, without limited herein.

According to the embodiments of the present invention, the specific shapes of the upper cavity 111 and the lower cavity 211 are not particularly limited herein, for example, they may be triangle-shaped cavities, rectangle-shaped cavities, square-shaped cavities, or the like. In an exemplary example, as illustrated by FIG. 2, the upper cavity 11 and the lower cavity 211 each are arc-shaped cavity. The arc shaped cavity has a similar shape with that of the bending portion 301 of the flexible panel 30, which can not only guide the bending portion 301 to bend without applying a relatively concentrated extrusion force to the bending portion 301, but also reduce the relative friction, so as to facilitate extending the serve life of the flexible panel 30.

In the technical solution of the abovementioned embodiments of the present invention, upon the mobile terminal is folded, the bending portion 301 of the flexible panel 30 can be received in the upper cavity 111 and the lower cavity 211, so as to maintain a relatively large bending radius. With the present technical solution, it can significantly reduce the probability of breakage of the flexible panel 30 due to excessive bending angle, so as to considerably extend the serve life of the mobile terminal.

As illustrated by FIG. 2 to FIG. 5, in an exemplary example, the upper shell 11 includes a chute 112 connected with the upper cavity 111, and the lower shell 21 includes a lower chute 212 connected with the lower cavity 211. Besides, the mobile terminal further includes: an upper sliding plate 113 mounted in the upper chute 112; a lower sliding plate 213 mounted in the lower chute 212; and a driving element. The driving element is configured to drive the upper sliding element 113 to move to block an opening of the upper cavity 111 and drive the lower sliding plate 213 to move and block an opening of the lower cavity 211, upon the mobile terminal is unfolding to an extent that the upper 11 and the lower shell 21 form a maximum adjustable angle. And the driving element is further configured to drive the upper sliding plate 113 to move and expose the opening of the upper cavity 111 and drive the lower sliding plate 213 to move and expose the opening of the lower cavity 211, upon the mobile terminal is folded.

With the technical solution, upon the mobile terminal is unfolding to an extent that the upper shell 11 and the lower shell 21 form a maximum adjustable angle, the upper sliding plate 113 moves and blocks the opening of the upper cavity 111, the lower sliding plate 213 moves and blocks the opening of the lower cavity 211, the bending portion 301 of the flexible panel 30 is supported by the upper sliding plate 113 and the lower sliding plate 213 so as to be parallel with the folding inner surfaces of the upper shell 11 and the lower shell 21. The technical solution allows the flexible panel 30 to have excellent display effect, and also good touch-control effect in case of touch screen.

According to the embodiments of the present invention, the specific structures and types of the driving element are not particularly limited herein. For example, in an embodiment of the present invention, the driving element is a driving motor, upon the mobile terminal is unfolding, the driving motor receives a first signal to drive the upper sliding plate and the lower sliding plate to move and block the openings of the corresponding cavities respectively; upon the mobile terminal is folded, the driving motor receives a second signal to drive the upper sliding plate and the lower sliding plate to move and expose the openings of the corresponding cavities respectively.

Figure 4:
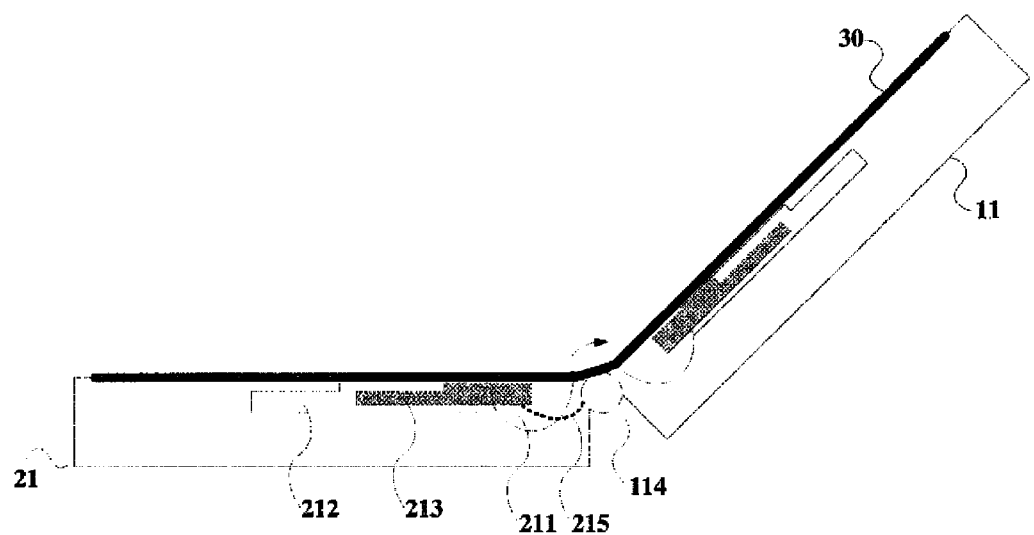
FIG. 4 is a schematic diagram illustrating a movement of a lower sliding plate in a foldable mobile terminal according to an embodiment of the present invention.

As illustrated by FIG. 4 and FIG. 5, in an exemplary example, the driving element includes: an upper linkage rod 115 connected between the upper sliding plate 113 and the lower hinge element 214; and a lower linkage rod 215 connected between the lower sliding plate 213 and the upper hinge element 114. In the technical solution, upon the mobile terminal is unfolding, the upper hinge element 114 is rotated forward with respect to the lower hinge element 214, the upper linkage rod 115 pulls the lower sliding plate 213 to move and block the opening of the lower cavity 211, and the lower linkage rod 215 pulls the upper sliding plate 113 to move and block the opening of the upper cavity 111; upon the mobile terminal is folded, the upper hinge element 114 is rotated backward with respect to the lower hinge element 214, the upper linkage rod 115 pushes the lower sliding plate 213 to move and expose the opening of the lower cavity 211, and the lower linkage rod 215 pushes the upper sliding plate 113 to move and expose the opening of the upper cavity 111. As seen, the driving element has a simple structure, reliable movement, and relatively low manufacturing costs.

The present disclosure claims the benefits of Chinese patent application No. 201510025628.1, titled "A FOLDABLE MOBILE TERMINAL", which was filed with the SIPO on Jan. 19, 2015 and is fully incorporated herein by reference as part of this application.

What is claimed is:

1. A foldable mobile terminal, comprising an upper shell and a lower shell that are hinged; and a flexible panel disposed at folding inner surfaces of the upper shell and the lower shell, wherein
   at least one of the upper shell and the lower shell can be pivoted inwardly or outwardly to an adjustable angle with respect to a hinge axis;
   a region of the upper shell closer to the hinge axis comprises an upper cavity which is formed to be concaved from an inner side of the upper shell in a direction away from the flexible panel, and a region of the lower shell closer to the hinge axis comprises a lower cavity which is formed to be concaved from an inner side of the lower shell in a direction away from the flexible panel;
   a region of the flexible panel closer to the hinge axis comprises a bending portion, and the flexible panel can be bent at the bending portion, and wherein
   upon at least one of the upper shell and the lower shell is pivoted inwardly with respect to the hinge axis, the bending portion can be received in the upper cavity and the lower cavity,
   the upper shell comprises an upper chute communicated with the upper cavity, and the lower shell comprises a lower chute communicated with the lower cavity, and the mobile terminal further comprises:
      an upper sliding plate mounted in the upper chute;
      a lower sliding plate mounted in the lower chute; and
      a driving element, the driving element is configured to drive the upper sliding plate to be partly protruded out of the upper chute to block an opening of the upper cavity and drive the lower sliding plate to be partly protruded out of the lower chute to block an opening of the lower cavity upon at least one of the upper shell and the lower shell is pivoted outwardly to a maximum adjustable angle with respect to the hinge axis; and the driving element is further configured to drive the upper sliding plate to be completely retracted to the upper chute to expose the opening of the upper cavity and drive the lower sliding plate to be completely retracted to the lower chute to expose the opening of the lower cavity upon at least one of the upper shell and the lower shell is pivoted inwardly with respect to the hinge axis to fold the mobile terminal.

2. The foldable mobile terminal according to claim 1, wherein both the upper cavity and the lower cavity are arc-shaped cavity.

3. The foldable mobile terminal according to claim 1, wherein a root portion of the upper shell comprises an upper hinge element, a root portion of the lower shell comprises a lower hinge element, and the lower hinge element and the upper hinge element are hinged with each other; and
   the driving element comprises:
      an upper linkage rod connected between the upper sliding plate and the lower hinge element; and
      a lower linkage rod connected between the lower sliding plate and the upper hinge element.

4. The foldable mobile terminal according to claim 3, wherein one of the upper hinge element and the lower hinge element has a hinge hole, and the other one of the upper hinge element and the lower hinge element has a hinge shaft which can be rotatablely mounted in the hinge hole.

5. The foldable mobile terminal according to claim 1, wherein the adjustable angle is within a range of 0°-180°.

6. The foldable mobile terminal according to claim 1, further comprising a display panel disposed on an outside surface of the upper shell.

7. The foldable mobile terminal according to claim 1, wherein the flexible panel comprises flexible display panel and flexible touch panel.

\* \* \* \* \*